United States Patent [19]

Nüsslein et al.

[11] 3,925,473

[45] Dec. 9, 1975

[54] HERBICIDAL OXIME ESTERS OF PHENOXYALKANOIC ESTERS AND THEIR USE AS SELECTIVE HERBICIDES

[75] Inventors: Ludwig Nüsslein; Friedrich Arndt, both of Berlin, Germany

[73] Assignee: Schering AG, Berlin and Bergkamen, Germany

[22] Filed: Dec. 12, 1973

[21] Appl. No.: 424,005

[52] U.S. Cl.............................. 260/566 AE; 71/121
[51] Int. Cl.².................................... C07C 131/00
[58] Field of Search............................ 260/566 AE

[56] References Cited
UNITED STATES PATENTS

| | | | |
|---|---|---|---|
| 3,165,392 | 1/1965 | Koopman | 260/566 AE |
| 3,169,989 | 2/1965 | Tieman et al. | 260/566 AE |
| 3,592,920 | 7/1971 | Gutman et al. | 260/566 AE |

*Primary Examiner*—Gerald A. Schwartz
*Attorney, Agent, or Firm*—Joseph F. Padlon

[57] ABSTRACT

Oxime esters of phenoxyalkanoic acids, having a common core of the formula

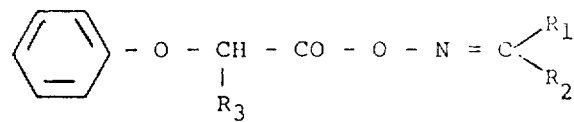

wherein $R_1$ and $R_2$ individually or jointly are hydrocarbyl or substituted hydrocarbyl, $R_3$ is hydrogen or lower alkyl, and the phenyl group carries up to three substituents, are herbicides harmless to cereal crops at application rates at which they destroy or at least severely damage numerous common weeds, including millets, which are intermingled with the crop plants.

3 Claims, No Drawings

HERBICIDAL OXIME ESTERS OF PHENOXYALKANOIC ESTERS AND THEIR USE AS SELECTIVE HERBICIDES

This invention relates to herbicides, and particularly to phenoxyalkanoic acid derivatives which are effective herbicides.

The known herbicides are not fully effective in combating millets in cereal crops. Millet is the common name of various small-seeded grasses which are annual, warm-season plants. Some are of value as crop plants in other countries, but they are generally considered weeds in North America. Typical millets which may seriously threaten a cereal crop are *Digitaria sanguinalis*, *Echinochloa crus galli*, and *Setaria faberii*.

The primary object of the invention is the provision of herbicidal agents specifically effective against millets, preferably also effective against other weeds, while harmless to cereal crops when applied to intermingled stands of the crops and weeds in concentrations effective severely to damage the weeds.

Such herbicidal agents have been found in the oxime esters of phenoxyalkanoic acids of the formula

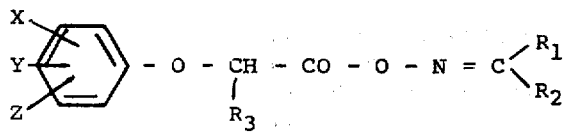

wherein $R_1$ and $R_2$ are members of the group consisting of hydrogen, aliphatic, cycloaliphatic, araliphatic, and aromatic hydrocarbyl groups, and mono- and polysubstitution products of such hydrocarbyl groups, not more than one of $R_1$ and $R_2$ being hydrogen, or $R_1$ and $R_2$ jointly constitute a divalent hydrocarbyl radical which may be interrupted by oxygen or nitrogen; $R_3$ is hydrogen or lower alkyl; and X, Y, and Z are members of the group consisting of hydrogen, lower alkyl, lower alkoxy, lower haloalkyl, and halogen.

$R_1$ and $R_2$ thus may be aromatic hydrocarbyl, such as phenyl or naphthyl; aliphatic hydrocarbyl having one to 12 carbon atoms, such as methyl, ethyl, propyl, isopropyl, butyl, and the higher homologs thereof; also cycloaliphatic hydrocarbyl having five to eight carbon atoms, such as cyclohexyl; furthermore araliphatic hydrocarbyl such as benzyl or phenylethyl; and substitution products of such hydrocarbyl radicals, the substituents being lower alkyl, such as methyl or ethyl, halogen, such as chlorine or bromine, lower alkoxy, such as methoxy or ethoxy. The lower alkyls which may constitute $R_3$ may have one to three carbon atoms.

When $R_1$ and $R_2$ jointly constitute a divalent hydrocarbyl radical, they may form a cycloaliphatic ring of five to eight carbon atoms with the carbon atom to which they are connected, such as cyclohexylidene, cyclooctylidene, and such rings may be further substituted by lower alkyl, such as methyl, and may also be interrupted by nitrogen or oxygen atoms.

The compounds of the invention have a surprisingly good herbicidal effect against the millets mentioned above. Best results are generally obtained by compounds in which $R_1$ and $R_2$ are hydrogen, alkyl having up to six carbon atoms, phenyl, nitrophenyl, loweralkoxy-lower-alkyl, or phenoxy-lower-alkyl, not more than one of $R_1$ and $R_2$ being hydrogen. Equally effective are compounds in which $R_1$ and $R_2$ jointly constitute a divalent aliphatic radical having a chain or four or five carbon atoms and a total of up to eight carbons including those in side chains. Lower alkyl and lower alkoxy include radicals having up to three carbon atoms.

In the preferred compounds of the invention, $R_3$ is hydrogen or methyl, X is chlorine, bromine or methyl, Y is chlorine, hydrogen, or methyl, and Z is hydrogen or chlorine. Particularly good results are achieved with compounds in which at least one of X, Y, and Z is halogen, and lower alkyl and lower alkoxy are methyl and methoxy respectively.

In addition to the millets mentioned above, the compounds of the invention have strong herbicidal effects on common weeds including *Sinapis sp.*, *Solanum sp.*, *Medicago sp.*, *Stellaria media*, *Senecio vulgaris*, *Matricaria chamomilla*, *Lamium amplexicaule*, *Centaurea cyanus*, *Amaranthus retroflexus*, *Galium aparine*, *Chrysanthemum segetum*, *Ipomea purpurea*, *Polygonum lapathifolium*, and others. When these weeds are intermingled with crop plants such as cereal crops (barley, wheat, oats, rye, corn, rice) and potatoes, the weeds may be damaged severely or destroyed by the compounds of the invention applied at rates at which the crop plants are unaffected. Amounts of 0.5 to 3 kg per hectare are effective in most instances, but higher application rates may be necessary under unusual conditions, and smaller amounts may be adequate under others.

The compounds of the invention are normally applied in the form of compositions containing 20 to 80 parts of the active ingredients in intimate mixtures with 80 to 20 parts inert matter serving as a carrier, the combined amount of active agents and carrier being 100 parts, all parts being by weight, and the composition preferably containing up to 20 parts of surfactant. The latter may serve as a wetting agent or emulsifier to enhance the herbicidal effect in a known manner although it may not be herbicidal in itself.

The active agents of the invention are compatible with each other and with many other herbicides such as maleic hydrazide, 3-amino-1,2,4-triazole, N-(1,1-dimethyl-2-propyl)-3,5-dichlorobenzamide, N,N-di-(n-propyl)-2,6-dinitro-4-trifluoromethylaniline, 4-amino-3,5,6-trichloropicolinic acid, 1,1'-dimethyl-4,4'-bipyridylium salts, and may be combined with the last-mentioned other herbicides in herbicidal compositions with the expected loss in selectivity where this is tolerable.

The herbicidal compositions in which compounds of the invention constitute active agents are formulated in a manner conventional in this art according to the desired method of application. Solid carriers are used in pulverulent or granular compositions, and aqueous liquids or organic solvents for liquid compositions in which the active agents of the invention may constitute a dispersed, separate phase.

Suitable liquid carriers include water, hydrocarbons including aliphatic petroleum fractions, also benzene, toluene, cyclohexanone, and isophorone. Solid carriers include silica gel, talcum, attaclay, kaolin and other clays, limestone, but also cereal flour. Suitable surfactants include, but are not limited to, calcium lignosulfonate, polyoxyethylene octylphenol ether, naphthalenesulfonic acid, phenolsulfonic acids, fatty alcohol sulfates, and alkali metal and alkaline earth metal salts of fatty acids.

The compositions may be applied in the usual manner. Aqueous compositions may thus be sprayed at a rate of 100 to 1,000 liters per hectare, or even higher when all weeds present are to be destroyed, and other modes of application will readily suggest themselves to suit specific requirements.

The compounds of the invention may be prepared by reacting oximes of the formula

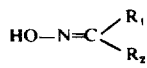

or their alkali metal salts, particularly the potassium or sodium salts, with phenoxyalkanoyl halides of the formula

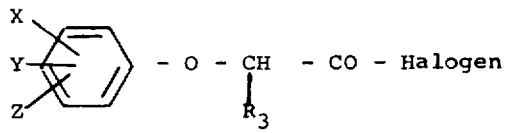

wherein $R_1$, $R_2$, $R_3$, X, Y, and Z are as defined above, in the presence of acid acceptors which may be organic or inorganic bases, triethylamine, dimethylaniline, pyridine, sodium carbonate, and sodium hydroxide being representative of suitable acceptors. The reaction may be performed in an inert organic solvent such as a chlorinated hydrocarbon, ether, ester, nitrile, carboxylic acid amide, or water. Methylene chloride, tetrahydrofuran, dioxane, ethyl acetate, acetonitrile, and dimethylformamide are preferred. Chlorine and bromine are the preferred halogens.

The oximes may also be reacted with anhydrides of the formula

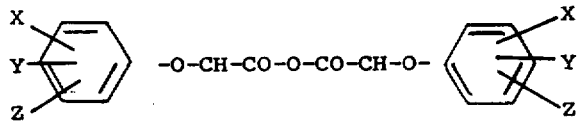

in the optional presence of an acid acceptor, such as pyridine, N,N-dimethylaniline, or triethylamine, and an inert solvent, benzene, pyridine, tetrahydrofuran, dioxane, dimethylsulfoxide, acetonitrile, and dimethylformamide being typical, suitable solvents.

The following Example illustrates the preparation of the compounds of the invention.

EXAMPLE 1

29.4 g 2,4-Dichlorophenoxyacetylchloride was added dropwise with stirring to a solution of 14.1 g methyl-(1-methylpropyl)-ketoxime and 12.4 g triethylamine in 200 ml acetonitrile, whereby the temperature of the mixture rose to 45°C. The mixture was further stirred for 3 hours, and then poured into 2 liters water. An oily precipitate formed and was extracted with ethyl ether. The solvent phase was separated, washed sequentially with dilute sodium hydroxide solution and water, and dried over desiccated magnesium sulfate. The solvent was partly evaporated at ambient pressure and ultimately in a high vacuum.

The oily residue consisted of 36.0 g 2,4-dichlorophenoxyacetic acid methyl-(1-methylpropyl)-ketoxime ester (92% yield). $n_D^{20} = 1.5360$. This ester will be referred to hereinafter as Compound No. 1.

Compounds Nos. 2 to 122 were prepared in an analogous manner from starting materials which are commercially available to a large extent and are readily prepared by known methods as far as not available. These compounds and their melting points or indices of refraction are listed in attached Table 1. They are colorless and odorless crystalline solids or oily liquids which are insoluble in water and benzene, but soluble in acetone, methylene chloride, tetrahydrofuran, dimethylformamide, cyclohexanone, and isophorone.

Examples 2 to 6 illustrate the use of compounds of the invention in combating weeds. The compounds were combined with the carriers mentioned in a conventional manner.

EXAMPLE 2

The compounds identified in Table 2 by the numbers assigned in Table 1 were applied at a rate of 3 kg of active agent per hectare in a greenhouse to cultures of four types of millet when the plants were at the two to three-leaf stage. The compounds were used in aqueous compositions in which the active agents were emulsified, and which were sprayed at a rate of 500 liters per hectare.

The plants were inspected 2 weeks after spraying, and the results achieved were evaluated on an empirical, numerical scale from 0 to 10, and value of 0 indicating total destruction, and a value of 10 the absence of damage recognizable from comparison with untreated controls of the same species.

EXAMPLE 3

The crop plants wheat, barley, rye, oats, and rice, and the common weeds identified in Table 3 were sprayed in a greenhouse after germination with aqueous emulsions of the compounds identified by the numbers assigned in Table 1. The emulsions were applied at a rate of 500 liters per hectare corresponding to 1 kg active agent per hectare.

The plants were inspected 2 weeks after spraying and the effects of the compounds were evaluated on the scale described in Example 2. None of the crop plants were found to have suffered any effects while the weeds were totally destroyed or at least severely stunted in their growth, as is shown in the Table.

EXAMPLE 4

The weeds identified in Table 4 were sprayed after germination with emulsions of the compounds of the invention identified by numbers assigned to them in Table 1 at a rate of 500 liters per hectare, corresponding to only 0.3 kg active agent per hectare. For comparison purposes, the weeds were also sprayed in the same manner with sodium 2,4-dichlorophenoxyacetate (Compound No. 123). Table 4 lists the results observed 2 weeks after spraying on the scale of Example 2.

EXAMPLE 5

The five crop plants mentioned in Example 3 and corn as well as six of the weeds mentioned in Example 3 were sprayed after germination with aqueous emulsions of compounds of the invention identified by numerals assigned to them in Table 1 at a rate of 0.3 kg active agent per hectare. For comparison purposes, 2-(2,4-dichlorophenoxy)-propionic acid (Compound No. 124) was tested in the same manner.

None of the crop plants were damaged by any of the active agents tested. The effects on the weeds after 2 weeks are listed in Table 5 in the same manner as in the preceding Examples 2 to 4.

EXAMPLE 6

*Setaria italica* was sprayed in a greenhouse after germination with aqueous emulsions of compounds of the invention at a rate of 500 liters per hectare, corresponding to 5 kg active agent per hectare. Three months after the spraying, the plants were inspected, and their condition was evaluated on a scale of 0 to 4, in which 0 indicates the absence of damage as compared to an untreated plant, 1 indicates minor damage, 2 moderate damage, 3 severe damage, and 4 total destruction.

All tested compounds produced at least moderate, long-term damage. More specifically, total destruction was observed in the plants treated with Compounds Nos. 1 to 7, 9, 14 to 18, 22, 28, 34 to 39, 45, 48 to 50, 52, 54, 55, 57 to 68, 70 to 73, 76, to 78, 80, 81, 100 to 111, and 114 to 122, while severe damage was produced by Compounds Nos. 8, 19, 23, 29–32, 40, 43, 44, 51, 53, 69, 79, 112, and 113. Only moderate damage was found in plants treated with Compounds Nos. 10 and 11, and experimental error may account for this fact.

The compounds enumerated in Table 1, but not mentioned in Examples 2 to 6, were subjected to random spot tests whose results indicated that their herbicidal effects are closely analogous to those of the compounds nearest in chemical composition which were tested more extensively.

TABLE I

| No. | Compound | $n_D^{20}$ | MP, °C |
|---|---|---|---|
| 2 | 2-(2,4-Dichlorophenoxy)-propionic acid acetoxime ester | 1.5390 | |
| 3 | 2,4-Dichlorophenoxy-acetic acid acetoxime ester | | 81 |
| 4 | 2-Methyl-4-chlorophenoxy-acetic acid acetoxime ester | | 58 |
| 5 | 2,4-Dichlorophenoxy-acetic acid 3,5,5-trimethyl-2-cyclohexenonoxime ester | | 112 |
| 6 | 2-Methyl-4-chlorophenoxy-acetic acid 3,5,5-trimethyl-2-cyclohexenonoxime ester | 96 | |
| 7 | 2,4,5-Trichlorophenoxy-acetic acid acetoxime ester | | 83 |
| 8 | 2-(2,4-Dichlorophenoxy)-propionic acid 3,5,5-trimethyl-2-cyclohexenonoxime ester | 1.5495 | |
| 9 | 2-(2-Methyl-4-chlorophenoxy)-propionic acid acetoxime ester | 1.5248 | |
| 10 | 2-(2,4-Dichlorophenoxy)-propionic acid acetophenonoxime ester | | 102 |
| 11 | 2-(2,4-Dichlorophenoxy)-propionic acid methylisobutylketoxime ester | 1.5245 | |
| 12 | 2-(2,4-Dichlorophenoxy)-propionic acid 3-nitrobenzaldoxime ester | | 72 |
| 13 | 2-(2,4-Dichlorophenoxy)-propionic acid benzophenonoxime ester | 1.6005 | |
| 14 | 2,4,5-Trichlorophenoxy-acetic acid cyclohexanonoxime ester | | 90 |
| 15 | 2-Methyl-4-chlorophenoxy-acetic acid cyclohexanonoxime ester | 1.5462 | |
| 16 | 2-(2,4,5-Trichlorophenoxy)-propionic acid acetoxime ester | | 67 |
| 17 | 2-(2,4,5-Trichlorophenoxy)-propionic acid cyclohexanonoxime ester | | 78 |
| 18 | 4-Bromophenoxy-acetic acid acetoxime ester | | 63 |
| 19 | 4-Bromophenoxy-acetic acid cyclohexanonoxime ester | | 79 |
| 20 | 2-(2,4-Dimethylphenoxy)-propionic acid acetoxime ester | | 70 |
| 21 | 2,4-Dichlorophenoxy-acetic acid methylethylketoxime ester | 1.5461 | |
| 22 | 2,4-Dichlorophenoxy-acetic acid diethylketoxime ester | 1.5411 | |
| 23 | 2,4-Dichlorophenoxy-acetic aid methylpropylketoxime ester | | 56 |
| 24 | 2-(2,4-Dichlorophenoxy)-propionic acid methylethylketoxime ester | 1.5324 | |
| 25 | 2-(2,4-Dichlorophenoxy)-propionic acid diethylketoxime ester | 1.5305 | |
| 26 | 2-(2,4-Dichlorophenoxy)-propionic acid methylpropylketoxime ester | 1.5292 | |
| 27 | 3-Chlorophenoxy-acetic acid acetoxime ester | 1.5406 | |
| 28 | 2,4-Dichlorophenoxy-acetic acid methylisobutylketoxime ester | 1.5354 | |
| 29 | 2,4-Dichlorophenoxy-acetic acid methylisopropylketoxime ester | 1.5383 | |
| 30 | 2-Methyl-4-chlorophenoxy-acetic acid methylethylketoxime ester | 1.5330 | |
| 31 | 2-Methyl-4-clorophenoxy-acetic acid diethylketoxime ester | 1.5297 | |
| 32 | 2-Methyl-4-chlorophenoxy-acetic acid methylpropylketoxime ester | | 60 |
| 33 | 2-(2,4-Dichlorophenoxy)-propionic acid butyrophenonoxime ester | 1.5666 | |
| 34 | 2-Methyl-4-chlorophenoxy-acetic acid diisobutylketoxime ester | 1.5112 | |
| 35 | 2-(2,4-Dichlorophenoxy)-propionic acid diisobutylketoxime ester | 1.5140 | |
| 36 | 2-(2-Methyl-4-chlorophenoxy)-propionic acid diisobutylketoxime ester | 1.5040 | |
| 37 | 2,4-Dichlorophenoxy-acetic acid diisobutylketoxime ester | 1.5210 | |
| 38 | 2,4-Dichlorophenoxy-acetic acid phenoxyacetoxime ester | 1.5720 | |
| 39 | 2-(2,4-Dichlorophenoxy)-propionic acid phenoxyacetoxime ester | 1.5628 | |
| 40 | 2-(2-Methyl-4-chlorophenoxy)-propionic acid diethylketoxime ester | 1.5179 | |
| 41 | 2-(2-Methyl-4-chlorophenoxy)-propionic acid methylethylketoxime ester | 1.5223 | |
| 42 | 2-(2-Methyl-4-chlorophenoxy)-propionic acid methylpropylketoxime ester | 1.5177 | |
| 43 | 2-(2-Methyl-4-chlorophenoxy)-propionic acid methylisobutylketoxime ester | 1.5125 | |
| 44 | 2,4,5-Trichlorophenoxy-acetic acid diethylketoxime ester | | 55 |
| 45 | 2,4,5-Trichlorophenoxy-acetic acid methylethylketoxime ester | 1.5581 | |
| 46 | 2,4,5-Trichlorophenoxy-acetic acid methylpropylketoxime ester | 1.5450 | |
| 47 | 2,4,5-Trichlorophenoxy-acetic acid methylisobutylketoxime ester | 1.5261 | |
| 48 | 2-Methyl-4-chlorophenoxy-acetic acid dipropylketoxime ester | 1.5210 | |
| 49 | 2,4-Dichlorophenoxy-acetic acid dipropylketoxime ester | 1.5319 | |
| 50 | 2-(2,4-Dichlorophenoxy)-propionic acid dipropylketoxime ester | 1.5210 | |
| 51 | 2,4,5-Trichlorophenoxy-acetic acid dipropylketoxime ester | | 44 |
| 52 | 2,4,5-Trichlorophenoxy-acetic acid diisobutylketoxime ester | 1.5287 | |
| 53 | 2-(2-Methyl-4-chlorophenoxy)-propionic acid dipropylketoxime ester | 1.5090 | |
| 54 | 2-Methyl-4-chlorophenoxy-acetic acid methylisopropylketoxime ester | 1.5282 | |
| 55 | 2-(2-Methyl-4-chlorophenoxy)-propionic acid methylisopropylketoxime ester | 1.5163 | |
| 56 | 2-(2,4-Dichlorophenoxy)-propionic acid methylisopropylketoxime ester | 1.5283 | |
| 57 | 2,4,5-Trichlorophenoxy-acetic acid methylisopropylketoxime ester | | 72 |
| 58 | 2-Methyl-4-chlorophenoxy-acetic acid methylhexylketoxime ester | 1.5160 | |
| 59 | 2,4-Dichlorophenoxy-acetic acid methylhexylketoxime ester | 1.5255 | |
| 60 | 2-(2-Methyl-4-chlorophenoxy)-propionic acid methylhexylketoxime ester | 1.5080 | |
| 61 | 2-(2,4-Dichlorophenoxy)-propionic acid methylhexylketoxime ester | 1.5182 | |
| 62 | 2,4,5-Trichlorophenoxy-acetic acid methylhexylketoxime ester | 1.5328 | |
| 63 | 2-(2-Methyl-4-chlorophenoxy)-propionic acid 3,5,5-trimethyl-2-cyclohexenonoxime ester | 1.5418 | |
| 64 | 2,4-Dichlorophenoxy-acetic acid 3,5-dimethyl-2-cyclohexenonoxime ester | | 80 |
| 65 | 2-(2,4-Dichlorophenoxy)-propionic acid 3,5-dimethyl-2-cyclohexenonoxime ester | 1.5571 | |
| 66 | 2,4,5-Trichlorophenoxy-acetic acid 3,5,5-trimethyl-2-cyclohexenonoxime ester | 1.5678 | |
| 67 | 2,4-Dichlorophenoxy-acetic acid cyclohexanonoxime ester | 1.5569 | |
| 68 | 2-(2,4-Dichlorophenoxy)-propionic acid cyclohexanonoxime ester | 1.5489 | |
| 69 | 2-(2-Methyl-4-chlorophenoxy)-propionic acid cyclohexanonoxime ester | 1.5372 | |
| 70 | 2,4-Dichlorophenoxy-acetic acid methyl-2-methoxyethylketoxime ester | 1.5412 | |
| 71 | 2-(2,4-Dichlorophenoxy)-propionic acid methyl-2-methoxyethylketoxime ester | 1.5311 | |
| 72 | 2-Methyl-4-chlorophenoxy-acetic acid ethylbutylketoxime ester | 1.5200 | |

TABLE 1 -continued

| No. | Compound | $n_D^{20}$ | MP, °C |
|---|---|---|---|
| 73 | 2,4-Dichlorophenoxy-acetic acid ethylbutylketoxime ester | 1.5292 | |
| 74 | 2-(2-Methyl-4-chlorophenoxy)-propionic acid ethylbutylketoxime ester | 1.5122 | |
| 75 | 2-(2,4-Dichlorophenoxy)-propionic acid ethylbutylketoxime ester | 1.5218 | |
| 76 | 2,4,5-Trichlorophenoxy-acetic acid ethylbutylketoxime ester | 1.5375 | |
| 77 | 2-Methyl-4-chlorophenoxy-acetic acid cyclopentanonoxime ester | | 72 |
| 78 | 2,4-Dichlorophenoxy-acetic acid cyclopentanonoxime ester | | oil |
| 79 | 2,4,5-Trichlorophenoxy-acetic acid cyclopentanonoxime ester | | 100–102 |
| 80 | 2-Methyl-4-chlorophenoxy-acetic acid 3-methyl-cyclopentanonoxime ester | | 71–72 |
| 81 | 2,4-Dichlorophenoxy-acetic acid 3-methyl-cyclopentanonoxime ester | 1.5485 | |
| 82 | 2,4-Dichlorophenoxy-acetic acid ethylpentylketoxime ester | 1.5269 | |
| 83 | 2-(4-Chloro-2-methylphenoxy)-propionic acid ethylpentylketoxime ester | 1.5072 | |
| 84 | 2-(2,4-Dichlorophenoxy)-propionic acid ethylpentylketoxime ester | 1.5182 | |
| 85 | 2,4,5-Trichlorophenoxy-acetic acid ethylpentylketoxime ester | 1.5321 | |
| 86 | 4-Chloro-2-methylphenoxy-acetic acid ethylpentylketoxime ester | 1.5158 | |
| 87 | 2,4-Dichlorophenoxy-acetic acid ethylisopropylketoxime ester | 1.5338 | |
| 88 | 2,4,5-Trichlorophenoxy-acetic acid ethylisopropylketoxime ester | 1.5400 | |
| 89 | 2-(2-Methyl-4-chlorophenoxypropionic acid ethylisopropylketoxime ester | 1.5142 | |
| 90 | 2-(2,4-Dichlorophenoxy)-propionic acid ethylisopropylketoxime ester | 1.5240 | |
| 91 | 2-Methyl-4-chlorophenoxy-acetic acid ethylisopropylketoxime ester | 1.5237 | |
| 92 | 4-Chloro-2-methylphenoxy-acetic acid isopropylpentylketoxime ester | 1.5109 | |
| 93 | 2,4-Dichlorophenoxy-acetic acid isopropylpentylketoxime ester | 1.5204 | |
| 94 | 2-(4-Chloro-2-methylphenoxy)-propionic acid isopropylpentylketoxime ester | 1.5031 | |
| 95 | 4-Chloro-2-methylphenoxy-acetic acid ethylpropylketoxime ester | 1.5229 | |
| 96 | 2,4-Dichlorophenoxy-acetic acid methyl-tert.-butylketoxime ester | | 56 |
| 97 | 2-(4-Chloro-2-methylphenoxy)-propionic acid methyl-tert.-butylketoxime ester | 1.5156 | |
| 98 | 2-(2,4-Dichlorophenoxy)-propionic acid isopropylpentylketoxime ester | 1.5128 | |
| 99 | 2,4-Dichlorophenoxy-acetic acid isopentylmethylketoxime ester | 1.5302 | |
| 100 | 2-(4-Chloro-2-methyl-phenoxy)-propionic acid isopentylmethylketoxime ester | 1.5075 | |
| 101 | 4-Chloro-2-methylphenoxy-acetic acid isopentylmethylketoxime ester | 1.5187 | |
| 102 | 2,4,5-Trichlorophenoxy-acetic acid isopentylmethylketoxime ester | 1.5354 | |
| 103 | 2-(4-Chloro-2-methylphenoxy)-propionic acid butylmethylketoxime ester | 1.5119 | |
| 104 | 2,4-Dichlorophenoxy-acetic acid butylmethylketoxime ester | 1.5338 | |
| 105 | 2-(2,4-Dichlorophenoxy)-propionic acid isopentylmethylketoxime ester | 1.5215 | |
| 106 | 2-(2,4-Dichlorophenoxy)-propionic acid butylmethylketoxime ester | 1.5246 | |
| 107 | 2,4,5-Trichlorophenoxy-acetic acid butylmethylketoxime ester | 1.5351 | |
| 108 | (4-Chloro-2-methylphenoxy)-acetic acid butylmethylketoxime ester | 1.5208 | |
| 109 | 2,4,5-Trichlorophenoxy-acetic acid methyl-tert.-butylketoxime ester | | 106 |
| 110 | 2-(2,4-Dichlorophenoxy)-propionic acid methyl-tert.-butylketoxime ester | 1.5246 | |
| 111 | 4-Chloro-2-methylphenoxy-acetic acid methyl-tert.-butylketoxime ester | 1.5209 | |
| 112 | 2-(2-Methyl-4-chlorophenoxy)-propionic acid 3-methyl-cyclopentanonoxime ester | 1.5272 | |
| 113 | 2-(2,4-Dichlorophenoxy)-propionic acid 3-methyl-cyclopentanonoxime ester | 1.5418 | |
| 114 | 2,4-Dichlorophenoxy-acetic acid ethylpropylketoxime ester | 1.5282 | |
| 115 | 2-(2,4-Dichlorophenoxy)-propionic acid ethylpropylketoxime ester | 1.5240 | |
| 116 | 2-(2-Methyl-4-chlorophenoxy)-propionic acid ethylpropylketoxime ester | 1.5133 | |
| 117 | 2,4,5-Trichlorophenoxy-acetic acid ethylpropylketoxime ester | 1.5440 | |
| 118 | 2,4,5-Trichlorophenoxy-acetic acid 3-methyl-cyclopentanonoxime ester | | 119–120 |
| 119 | 2-Methyl-4-chlorophenoxy-acetic acid diisopropyloxime ester | 1.5173 | |
| 120 | 2,4-Dichlorophenoxy-acetic acid diisopropyloxime ester | 1.5271 | |
| 121 | 2-(2-Methyl-4-chlorophenoxy)-propionic acid diisopropyloxime ester | 1.5092 | |
| 122 | 2-(2,4-Dichlorophenoxy)-propionic acid diisopropyloxime ester | 1.5190 | |

TABLE 2

| Compound No. | 2 | 3 | 4 | 9 | 16 | 17 | 21 | 23 | 28 | 29 | 30 | 31 | 32 | 34 | 35 | 36 | 37 | 38 | 40 | 43 | 44 | 45 | 46 | 47 | 48 | 49 |
|---|---|---|---|---|---|---|---|---|---|---|---|---|---|---|---|---|---|---|---|---|---|---|---|---|---|---|
| Digitaria sanguinalis | 2 | 1 | — | 4 | — | — | — | — | — | — | — | — | — | 3 | 5 | — | — | — | 2 | — | 3 | 3 | 4 | — | — | 5 |
| Echinochloa crus galli | — | 1 | 2 | 2 | 5 | 4 | 5 | 5 | 3 | 1 | 5 | 5 | 4 | 2 | 1 | 2 | 5 | 4 | 4 | 4 | 3 | 4 | 5 | 3 | 0 | 0 |
| Setaria italica | 1 | 0 | 1 | 1 | 2 | 3 | 5 | 5 | 1 | 4 | 5 | 5 | 5 | 2 | 1 | 1 | 5 | 4 | 4 | 4 | 4 | — | 1 | 0 | 0 | 0 |
| Setaria faberii | 1 | 0 | 0 | 1 | 3 | 3 | 3 | 4 | 1 | 3 | 2 | 5 | 5 | 2 | — | 3 | 1 | 4 | — | 4 | 4 | 5 | 0 | — | 1 | 1 |

TABLE 3

| Compound No. | 2 | 3 | 4 | 5 | 6 | 8 | 9 | 10 | 12 | 13 | 14 | 15 | 22 | 24 | 25 | 26 | 33 | 39 | 41 | 42 | 50 | 51 |
|---|---|---|---|---|---|---|---|---|---|---|---|---|---|---|---|---|---|---|---|---|---|---|
| Stellaria media | 0 | 0 | 1 | 4 | 3 | 0 | 0 | 1 | 1 | 1 | 4 | 4 | 4 | 1 | 3 | 1 | 2 | 0 | 0 | 0 | 0 | 2 |
| Senecio vulgaris | 0 | 1 | 0 | 1 | 1 | 4 | 4 | 2 | — | — | 2 | 2 | 1 | 2 | 4 | 3 | 2 | 2 | 1 | 1 | 0 | 1 |
| Matricaria chamomilla | 4 | 4 | 5 | — | — | — | 3 | — | — | — | — | — | — | — | — | — | 5 | — | — | — | — | — |
| Lamium amplexicaule | 4 | — | 3 | — | — | 4 | — | — | — | — | 2 | — | — | — | — | — | 5 | 2 | — | — | 1 | 0 |
| Centaurea cyanus | 0 | 0 | 0 | 2 | 1 | 3 | 4 | 3 | 2 | 3 | 1 | 2 | 1 | 2 | 3 | 2 | 2 | 3 | 2 | 3 | 0 | 3 |
| Amaranthus retroflexus | 0 | 0 | 0 | 1 | 0 | 0 | 0 | 1 | 0 | 2 | — | — | 1 | 1 | 1 | 5 | 2 | 1 | 2 | 1 | 2 | 1 |
| Galium aparine | 0 | — | — | — | — | 3 | 2 | 0 | 1 | 4 | — | — | 1 | 0 | 0 | — | — | — | — | — | 1 | — |
| Chrysanthemum segetum | 3 | 1 | 1 | 1 | 3 | 5 | 3 | — | 3 | 2 | 2 | 3 | 2 | — | — | — | 5 | — | 4 | 4 | 3 | 3 |
| Ipomea purpurea | 0 | 0 | 0 | 1 | 0 | 2 | 5 | 1 | 3 | 3 | 0 | 0 | 0 | 4 | 4 | — | 1 | 4 | 2 | 2 | 1 | 0 |
| Polygonum lapathifolium | 0 | 0 | 1 | 1 | 1 | 0 | 1 | 1 | 1 | 1 | — | 1 | 0 | 0 | 1 | 4 | 2 | 2 | 2 | 0 | 3 | |

TABLE 4

| Compound No. | 3 | 22 | 49 | 123 |
|---|---|---|---|---|
| Stellaria media | 5 | 6 | 2 | 7 |
| Senecio vulgaris | 2 | 3 | 1 | 5 |
| Matricaria chamomilla | 5 | 10 | 10 | 10 |
| Lamium amplexicaule | 10 | 10 | 6 | 10 |
| Centaurea cyanus | 3 | 8 | 0 | 4 |
| Amaranthus retroflexus | 3 | 2 | 5 | 8 |
| Galium aparine | 10 | 10 | 4 | 10 |
| Chrysanthemum segetum | 3 | 4 | 4 | 8 |
| Ipomea purpurea | 0 | 0 | 0 | 1 |
| Polygonum lapathifolium | 0 | 0 | 0 | 8 |

TABLE 5

| Compound No. | 11 | 26 | 35 | 50 | 56 | 61 | 68 | 72 | 73 | 74 | 124 |
|---|---|---|---|---|---|---|---|---|---|---|---|
| Stellaria media | 2 | 4 | 4 | — | 4 | — | 3 | 3 | 4 | 3 | 6 |
| Senecio vulgaris | 2 | 2 | 1 | 3 | 1 | 2 | 5 | 2 | 1 | 1 | 10 |
| Lamium amplexicaule | — | 2 | 2 | 4 | 1 | 2 | 3 | 5 | 3 | 2 | 10 |
| Centaurea cyanus | 4 | — | 6 | 6 | 2 | 0 | 4 | 2 | 2 | 6 | 10 |
| Galium aparine | — | 3 | 1 | 2 | 3 | 1 | 2 | — | — | 1 | 5 |
| Ipomea purpurea | 2 | — | 1 | 5 | 1 | 3 | 3 | 3 | 3 | 4 | 7 |

What is claimed is:
1. A compound of the formula

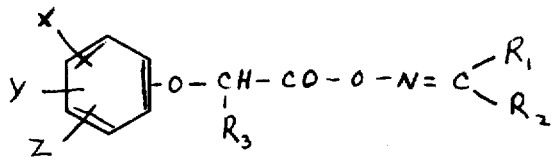

wherein $R_1$ and $R_2$ each represent a member selected from the group consisting of alkyl groups containing from one to six carbon atoms, phenoxymethyl, 2-methoxymethyl, phenyl, nitrophenyl, methylphenyl, chlorophenyl, and hydrogen except that $R_1$ and $R_2$ cannot both be hydrogen; $R_1$ and $R_2$ taken together with the adjacent carbon atom can be cyclopentylidene, 3-methylcyclopentylidene, cyclohexlidene, dimethylcyclohexylidene or trimethylcyclohexylidene; $R_3$ can be hydrogen or methyl and X, Y, and Z taken individually can be hydrogen, methyl or a halogen.

2. A compound as set forth in claim 1, wherein at least one of said X, Y, and Z is halogen.

3. A compound as set forth in claim 2, wherein said lower alkyl is methyl, and said alkoxy is methoxy.

* * * * *